US011030360B2

(12) United States Patent
Sato et al.

(10) Patent No.: US 11,030,360 B2
(45) Date of Patent: Jun. 8, 2021

(54) AIRCRAFT DESIGNING METHOD, AIRCRAFT DESIGNING PROGRAM AND AIRCRAFT DESIGNING APPARATUS

(71) Applicant: SUBARU CORPORATION, Tokyo (JP)

(72) Inventors: Kazushige Sato, Tokyo (JP); Chikage Murakami, Tokyo (JP); Hideo Iso, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 401 days.

(21) Appl. No.: 14/864,478

(22) Filed: Sep. 24, 2015

(65) Prior Publication Data

US 2016/0092629 A1 Mar. 31, 2016

(30) Foreign Application Priority Data

Sep. 30, 2014 (JP) .............................. JP2014-200622

(51) Int. Cl.
*G06F 30/15* (2020.01)
*G06F 111/04* (2020.01)
(Continued)

(52) U.S. Cl.
CPC .......... *G06F 30/15* (2020.01); *G06F 2111/04* (2020.01); *G06F 2111/06* (2020.01); *G06F 2111/10* (2020.01); *Y02T 90/00* (2013.01)

(58) Field of Classification Search
CPC ............. G06F 17/5095; G06F 2217/16; G06F 2217/06; G06F 2217/08; G06F 30/15;
(Continued)

(56) References Cited

U.S. PATENT DOCUMENTS

| 2002/0134891 A1* | 9/2002 | Guillot | ...................... B64C 3/00 244/204.1 |
| 2006/0058985 A1* | 3/2006 | Arslan | ................ G06F 17/5095 703/2 |

(Continued)

FOREIGN PATENT DOCUMENTS

| JP | 01-285494 A | 11/1989 | |
| JP | H01-285494 | * 11/1989 | ............... B64D 7/00 |

OTHER PUBLICATIONS

Leary et al. "A Derivative Based Surrogate Model for Approximating and Optimizing the Output of an Expensive Computer Simulation." Journal of Global Optimization, vol. 30, pp. 39-58 (2004) [retrieved on Oct. 20, 2017]. Retrieved from <https://link.springer.com/article/10.1023/B:JOGO.0000049094.73665.7e>.*

(Continued)

*Primary Examiner* — Rehana Perveen
*Assistant Examiner* — Alfred H B Wechselberger
(74) *Attorney, Agent, or Firm* — McDermott Will & Emery LLP (57) ABSTRACT

An aircraft designing apparatus receives set values of design parameters related to the shape of an intake duct, creates analysis models for an aerodynamic characteristic analysis and a radar-cross-section analysis by using the values of the design parameters, calculates aerodynamic characteristics and radar-cross-section characteristics of the intake duct, and determines whether or not this analytical result satisfies a preset design condition. If it is determined that the analytical result does not satisfy the design condition, the values of the design parameters are updated. The updating of the design parameters, the analyses of the aerodynamic characteristics and the radar-cross-section characteristics, and the determining process are repeated until it is determined that the analytical result satisfies the design condition.

9 Claims, 7 Drawing Sheets

(51) Int. Cl.
  *G06F 111/06* (2020.01)
  *G06F 111/10* (2020.01)
(58) Field of Classification Search
  CPC .. G06F 2111/04; G06F 2111/10; Y02T 90/50; Y02T 90/00
  See application file for complete search history.

(56) References Cited

U.S. PATENT DOCUMENTS

| | | | | |
|---|---|---|---|---|
| 2006/0069533 | A1* | 3/2006 | Florea | F01D 5/145 703/1 |
| 2006/0089737 | A1* | 4/2006 | Forrester | G06F 17/5004 700/97 |
| 2014/0372093 | A1* | 12/2014 | Takami | G06F 17/5095 703/8 |

OTHER PUBLICATIONS

Deb et al. "A Fast and Elitist Multiobjective Genetic Algorithm: NSGA-II." IEEE Transactions on Evolutionary Computation, vol. 6, No. 2 (2002) [retrieved on Oct. 20, 2017]. Retrieved from <http://ieeexplore.ieee.org/abstract/document/996017/>.*

Mantel, et al. "Evolutionary Computational Methods for Complex Design in Aerodynamics." 36th Aerospace Sciences Meeting and Exhibit, AIAA 98-0222: Reno, NV (1998) [retrieved on Oct. 20, 2017]. Retrieved from <https://arc.aiaa.org/doi/pdf/10.2514/6.1998-222>.*

Liqiang et al. "Robust Design of Mars entry micro-probe with evidence theory and multi-fidelity strategies." Engineering Computations, vol. 31, Iss. 6, pp. 1052-1073, (2014) [retrieved on Oct. 20, 2017]. Retrieved from <https://www.researchgate.net/profile/Hou_Liqiang/publication/265857129_Robust_design_of_Mars_entry_micro-pr>.*

Park et al. "Multidisciplinary wing design optimization considering global sensitivity and uncertainty of approximation models." Journal of Mechanical Science and Technology, vol. 28, No. 6 (2014) pp. 2231-2242 [retrieved on Oct. 20, 2017]. Retrieved from <https://link.springer.com/article/10.1007/s12206-014-0127-1>.*

Lee et al. "Multi-Objective / Multidisciplinary Design Optimisation of Blended Wing Body UAV via Advanced Evolutionary Algorithms." 45th AIAA Aerospace Sciences Meeting and Exhibit, AIAA 2007-36: Reno, NV (2007) [retrieved on Oct. 20, 2017]. Retrieved from STIC.*

Tianyuan et al. "Aerodynamic/Stealthy/Structural Multidisciplinary Design Optimization of Unmanned Combat Air Vehicle." Chinese Journal of Aeronautics, vol. 22 (2009), pp. 380-386 [retrieved on Oct. 20, 2017]. Retrieved from <http://www.sciencedirect.com/science/article/pii/S1000936108601144>.*

Liao et al. "Multi-Objective Aerodynamic and Stealthy Performance Optimization for Airfoil Using Kriging Surrogate Model." 2011 IEEE 3rd International Conference on Communication Software and Networks, doi: 10.1109/ICCSN.2011.6013971 [retrieved on Oct. 20, 2017]. Retrieved from <http://ieeexplore.ieee.org/abstract/document/6013971/>.*

Harmon et al. "Application of a Finite-Volume Time-Domain Method to Three-Dimensional Objects" Antennas and Propagation Society International Symposium (1997) [retrieved on Jul. 2, 2018]. Retrieved from <https://ieeexplore.ieee.org/abstract/document/630097>.*

Shankar et al. "A Time-Domain Differential Solver for Electromagnetic Scattering Problems" Proceedings of the IEEE, vol. 77, No. 5 (1989) [retrieved on Jul. 2, 2018]. Retrieved from <https://ieeexplore.ieee.org/document/32061>.*

Arias-Montano et al. "Multiobjective Evolutionary Algorithms in Aeronautical and Aerospace Engineering" IEEE Transactions on Evolutionary Computation, vol. 16, No. 5 (2012) [retrieved on Jul. 2, 2018]. Retrieved from <https://ieeexplore.ieee.org/document/6151094>.*

Wikipedia contributors. "Computational fluid dynamics." Wikipedia, The Free Encyclopedia (Jun. 2018) [retrieved on Jul. 3, 2018]. Retrieved from <https://en.wikipedia.org/w/index.php?title=Computational_fluid_dynamics&oldid=627024318>.*

Singh et al. "Active Radar Cross Section Reduction: Theory and Applications", [excerpt] Chapter 1, pp. 1-10 (2015): Cambridge University Press [retrieved on Jul. 5, 2018]. Retrieved from <http://assets.cambridge.org/97811070/92617/excerpt/9781107092617_excerpt.pdf>.*

Hong et al. "Stochastic Mutation Algorithm in Multi-objective Design Optimization" 2006 49th IEEE International Midwest Symposium on Circuits and Systems; doi: 10.1109/MWSCAS.2006.382203 [retrieved on Dec. 10, 2018]. Retrieved from <https://ieeexplore.ieee.org/document/4267281> (Year: 2006).*

Shankar et al. "A CFD-Based Finite-Volume Procedure for Computational Electromagnetics—Interdisciplinary Applications of CFD Methods" American Institute of Aeronautics and Astronautics, 89-1987-CP [retrieved on Dec. 10, 2018]. Retrieved from <https://arc.aiaa.org/doi/10.2514/6.1989-1987> (Year: 1987).*

Gou et al. "The Research of Structural Optimization with the Constraints of Aerodynamics and Radar Cross Section (RCS) of Aircraft" 25th International Congress of the Aeronautical Sciences [retrieved on Dec. 10, 2018]. Retrieved from <http://www.icas.org/ICAS_ARCHIVE/ICAS2006/PAPERS/062.PDF> (Year: 2006).*

Zhang et al. "Multidisciplinary Design of S-shaped Intake"AIAA 2008-7060, 26th Applied Aerodynamics Conference, Honolulu, Hawaii [retrieved on Jun. 4, 2019]. Retrieved from <https://arc.aiaa.org/doi/abs/10.2514/6.2008-7060> (Year: 2008).*

Akram et al. "Improved Submerged Inlet Conceptual Design Process using Data Mining and Surrogate Modeling"AIAA 2010-3515, AIAA Infotech@Aerospace 2010, Atlanta, Georgia [retrieved on Jun. 4, 2019]. Retrieved from <https://arc.aiaa.org/doi/pdf/10.2514/6.2010-3515> (Year: 2010).*

Hamalainen et al. "Evolutionary Shape Optimization in CFD with Industrial Applications" ECCOMAS 2000, Barcelona [retrieved on Oct. 20, 2017]. Retrieved from <http://citeseerx.ist.psu.edu/viewdoc/download?doi=10.1.1.17.3553&rep=rep1&type=pdf> (Year: 2000).*

Allison et al. "A Multidisciplinary Design Optimization Framework for Design Studies of an Efficient Supersonic Air Vehicle" 12th AIAA/ATIO and 14th AIAA/ISSM Conference, Indiana [retrieved on Apr. 21, 2020]. Retrieved from <https://arc.aiaa.org/doi/pdf/10.2514/6.2012-5492> (Year: 2012).*

Liu, H. "Multiobjective Evolutionary Computation for Noncircular Missile Shape Optimization"AIAA 2004-453, 42 AIAA Aerospace Sciences Meeting and Exhibit, Reno, Nevada [retreived on Sep. 14, 2020]. (Year: 2004).*

* cited by examiner

AIRCRAFT DESIGNING METHOD, AIRCRAFT DESIGNING PROGRAM AND AIRCRAFT DESIGNING APPARATUS

CROSS-REFERENCE TO RELATED APPLICATIONS

The present application claims priority from Japanese Patent Application No. 2014-200622 filed on Sep. 30, 2014, the entire contents of which are hereby incorporated by reference.

BACKGROUND

1. Technical Field

The present invention relates to aircraft designing methods, aircraft designing programs, and aircraft designing apparatuses suitable for designing aircrafts having shapes that require both aerodynamic characteristics and stealth characteristics.

2. Related Art

Some aircrafts, such as fighter aircrafts, require stealth characteristics (resistance to detection by, for instance, radar) in addition to desired aerodynamic characteristics. In such cases, a design that achieves both aerodynamic characteristics and stealth characteristics is necessary.

For example, in the design of an intake duct in an aircraft of this type, it is known to provide a radio-wave absorber on the inner wall of the intake duct while curving the duct shape so as to suppress radio-wave reflection from the engine toward the bow of the aircraft, thus enhancing the stealth characteristics (for instance, see Japanese Unexamined Patent Application Publication No. 01-285494). In such a curved duct, pressure loss tends to occur due to, for instance, separation of internal airflow, possibly leading to lower aerodynamic characteristics (engine performance).

Accordingly, because the aerodynamic characteristics and the stealth characteristics have a tradeoff relationship in the intake duct and so on, the intake duct has to be designed such that these characteristics respectively satisfy desired conditions.

In actuality, when designing the intake duct in the related art, a database of aerodynamic characteristics is first created by performing wind-tunnel tests and referring to known data and other aircraft examples so as to set a criterion for the aerodynamic characteristics. Likewise, with regard to a radar cross section, which is a parameter of stealth characteristics, a database is created from tests and other aircraft examples. Then, the shape of the intake duct is determined such that the shape satisfies these criteria.

However, the design method in the related art described above has some problems.

Firstly, since data of stealth aircrafts are normally not disclosed, there is a limit to determining the shape thereof from disclosed information, such as photographs. Thus, it is difficult to set the criteria.

Moreover, if basic data necessary for setting the criteria is to be obtained from tests, an enormous amount of cost and labor is required.

SUMMARY OF THE INVENTION

Accordingly, an object of the present invention is to appropriately design the shape of an aircraft that requires both aerodynamic characteristics and stealth characteristics while reducing cost and labor, as compared with the related art.

A first aspect of the present invention provides an aircraft designing method of designing a shape of a predetermined design object in an aircraft. The aircraft designing method includes a design-parameter setting step for setting a value of a design parameter related to the shape of the design object; an analyzing step for creating analysis models for an aerodynamic characteristic analysis and a radar-cross-section analysis by using the value of the design parameter and calculating aerodynamic characteristics and radar-cross-section characteristics of the design object; a determining step for determining whether or not an analytical result obtained in the analyzing step satisfies a preset design condition; and a design-parameter updating step for updating the value of the design parameter if a determination result obtained in the determining step indicates that the analytical result obtained in the analyzing step does not satisfy the design condition. The analyzing step, the determining step, and the design-parameter updating step are repeated until the determination result obtained in the determining step indicates that the analytical result obtained in the analyzing step satisfies the design condition.

A radar cross section is a parameter of stealth characteristics. In other words, the term "radar-cross-section characteristics" refers to radio-wave stealth characteristics.

A second aspect of the present invention provides an aircraft designing method of designing a shape of a predetermined design object in an aircraft. The aircraft designing method includes a design-parameter setting step for setting a plurality of values to a design parameter related to the shape of the design object; an analyzing step for creating analysis models for an aerodynamic characteristic analysis and a radar-cross-section analysis with respect to the values of the design parameter set in the design-parameter setting step and calculating aerodynamic characteristics and radar-cross-section characteristics of the design object so as to obtain a plurality of sampling analytical results corresponding to the plurality of values of the design parameter; a response-surface generating step for generating response surfaces of the aerodynamic characteristics and the radar-cross-section characteristics with respect to the design parameter from the plurality of sampling analytical results obtained in the analyzing step; and a solution searching step for searching for a solution of the design parameter that satisfies a preset design condition based on the response surfaces of the aerodynamic characteristics and the radar-cross-section characteristics generated in the response-surface generating step.

In the aircraft designing method according to the first aspect of the present invention, the design condition may include an optimizing condition related to the aerodynamic characteristics and the radar-cross-section characteristics. The design-parameter updating step may include updating the value of the design parameter while optimizing the value of the design parameter if the determination result indicates that the analytical result obtained in the analyzing step does not satisfy the design condition including the optimizing condition.

The aircraft designing method according to the second aspect of the present invention may further include a second analyzing step for creating analysis models for an aerodynamic characteristic analysis and a radar-cross-section analysis by using the solution of the design parameter obtained in the solution searching step and recalculating the aerodynamic characteristics and the radar-cross-section characteristics of the design object; and a determining step for comparing an analytical result obtained in the second analyzing step with the aerodynamic characteristics and the radar-cross-section characteristics obtained from the response surfaces generated in the response-surface generating step and determining whether or not the response surfaces have desired accuracy based on a comparison result. If a determination result obtained in the determining step indicates that the response surfaces do not have the desired accuracy, a new value may be added to the design parameter and the analyzing step and the response-surface generating step may be executed so that the response surfaces may be updated.

In the aircraft designing method according to the second aspect of the present invention, the design condition may include an optimizing condition related to the aerodynamic characteristics and the radar-cross-section characteristics. The solution searching step may include searching for an optimal solution of the design parameter that satisfies the design condition including the optimizing condition.

In the aircraft designing method according to one of the first and second aspects of the present invention, determination of whether or not the optimizing condition is satisfied may be performed by using an objective function having a term expressing the aerodynamic characteristics and a term expressing the radar-cross-section characteristics.

In the aircraft designing method according to one of the first and second aspects of the present invention, the design object may be an intake duct.

A third aspect of the present invention provides an aircraft designing program having features similar to the aircraft designing method according to the first aspect.

A fourth aspect of the present invention provides an aircraft designing program having features similar to the aircraft designing method according to the second aspect.

A fifth aspect of the present invention provides an aircraft designing apparatus having features similar to the aircraft designing method according to the first aspect.

A sixth aspect of the present invention provides an aircraft designing program having features similar to the aircraft designing method according to the second aspect.

DETAILED DESCRIPTION

Examples of the present invention will be described below with reference to the drawings.

First Example

A first example of the present invention will be described first.

Configuration of Aircraft Designing Apparatus 1

Figure 1:
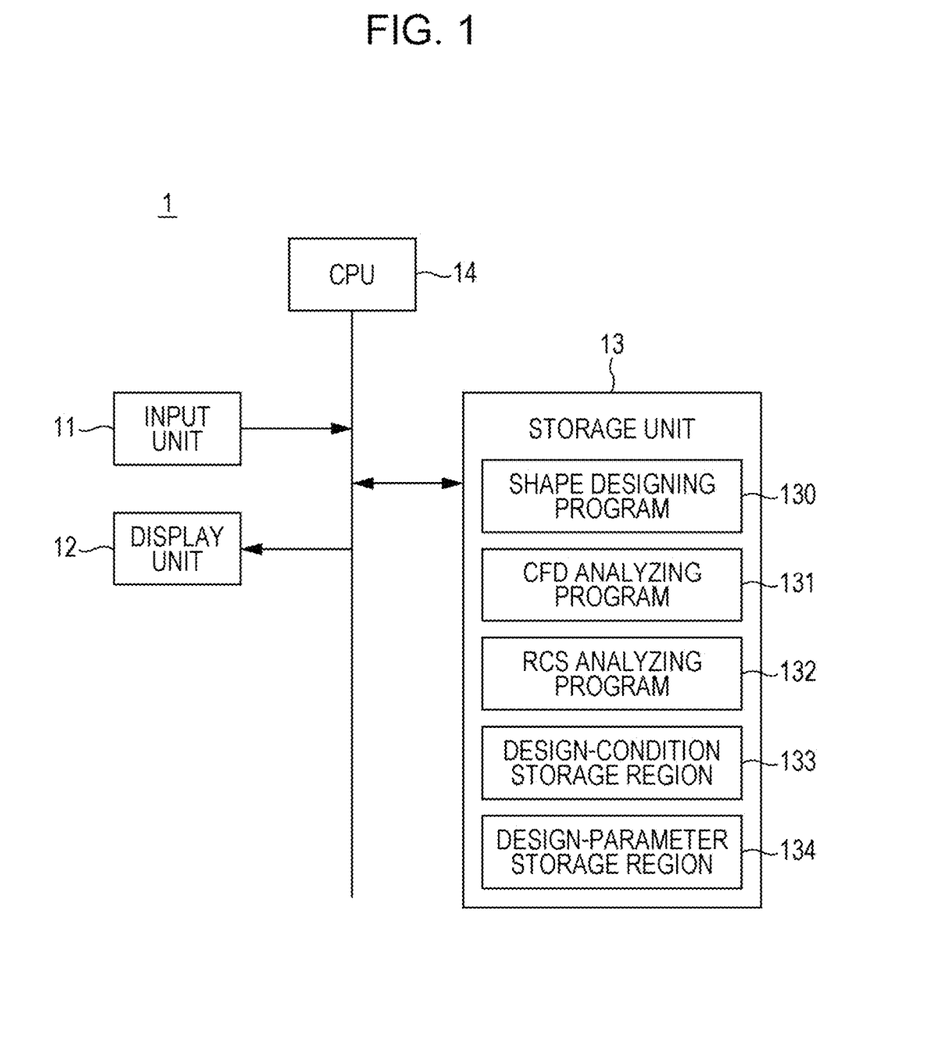
FIG. 1 is a block diagram illustrating a functional configuration of an aircraft designing apparatus according to a first example.

FIG. 1 is a block diagram illustrating a functional configuration of an aircraft designing apparatus 1 according to a first example of the present invention.

The aircraft designing apparatus 1 is an information processing apparatus that designs the shapes of various parts of an aircraft and includes an input unit 11, a display unit 12, a storage unit 13, and a central processing unit (CPU) 14, as illustrated in FIG. 1.

The input unit 11 includes various types of input keys (not illustrated) and outputs an input signal corresponding to the position of a pressed key to the CPU 14.

The display unit 12 includes a display (not illustrated) and displays various types of information on the display based on a display signal received from the CPU 14.

The storage unit 13 is a memory constituted of, for instance, a random access memory (RAM) and a read-only memory (ROM). The storage unit 13 stores various types of programs and data and also functions as a working area of the CPU 14. In the first example, the storage unit 13 stores a shape designing program 130, a computational-fluid-dynamics (CFD) analyzing program 131, and a radar-cross-section (RCS) analyzing program 132.

The shape designing program 130 is an aircraft designing program according to an example of the present invention that causes the CPU 14 to execute a shape designing process (see FIG. 2), which will be described later.

The CFD analyzing program 131 is a computational-fluid-dynamics (CFD) analyzing software program that calculates the aerodynamic characteristics of a design object.

The RCS analyzing program 132 is an electromagnetic-field analyzing software program that calculates the radar-cross-section (RCS) characteristics of the design object. A radar cross section is a parameter that quantitatively expresses stealth characteristics (resistance to detection by, for instance, radar) and indicates that the stealth characteristics become higher with decreasing value. In other words, the RCS characteristics indicate radio-wave stealth characteristics.

Although not illustrated, the storage unit 13 also stores a three-dimensional computer-aided-design (CAD) software program that creates analysis models for the CFD analyzing program 131 and the RCS analyzing program 132.

The storage unit 13 also has a design-condition storage region 133 and a design-parameter storage region 134.

The design-condition storage region 133 is a memory region that stores design conditions (an optimizing condition and a limiting condition, which will be described later, in the first example) in the shape designing process to be described later.

The design-parameter storage region 134 is a memory region that stores design parameters in the shape designing process to be described later.

The CPU 14 executes a process based on a predetermined program in accordance with an input command and, for instance, sends commands and transfers data to the respective functional units so as to perform overall control of the aircraft designing apparatus 1. Specifically, the CPU 14 reads each type of program from the storage unit 13 in accordance with, for instance, an operation signal received from the input unit 11 and executes a process in accordance with the program. Then, the CPU 14 temporarily stores a process result in the storage unit 13 and causes the display unit 12 to appropriately output the process result.

Operation of Aircraft Designing Apparatus 1

Next, the operation performed when the aircraft designing apparatus 1 executes the shape designing process will be described. The following description relates to a case where an intake duct (a curved duct) that is provided in the fuselage of an aircraft and that takes air into the engine is the design object.

Figure 2:
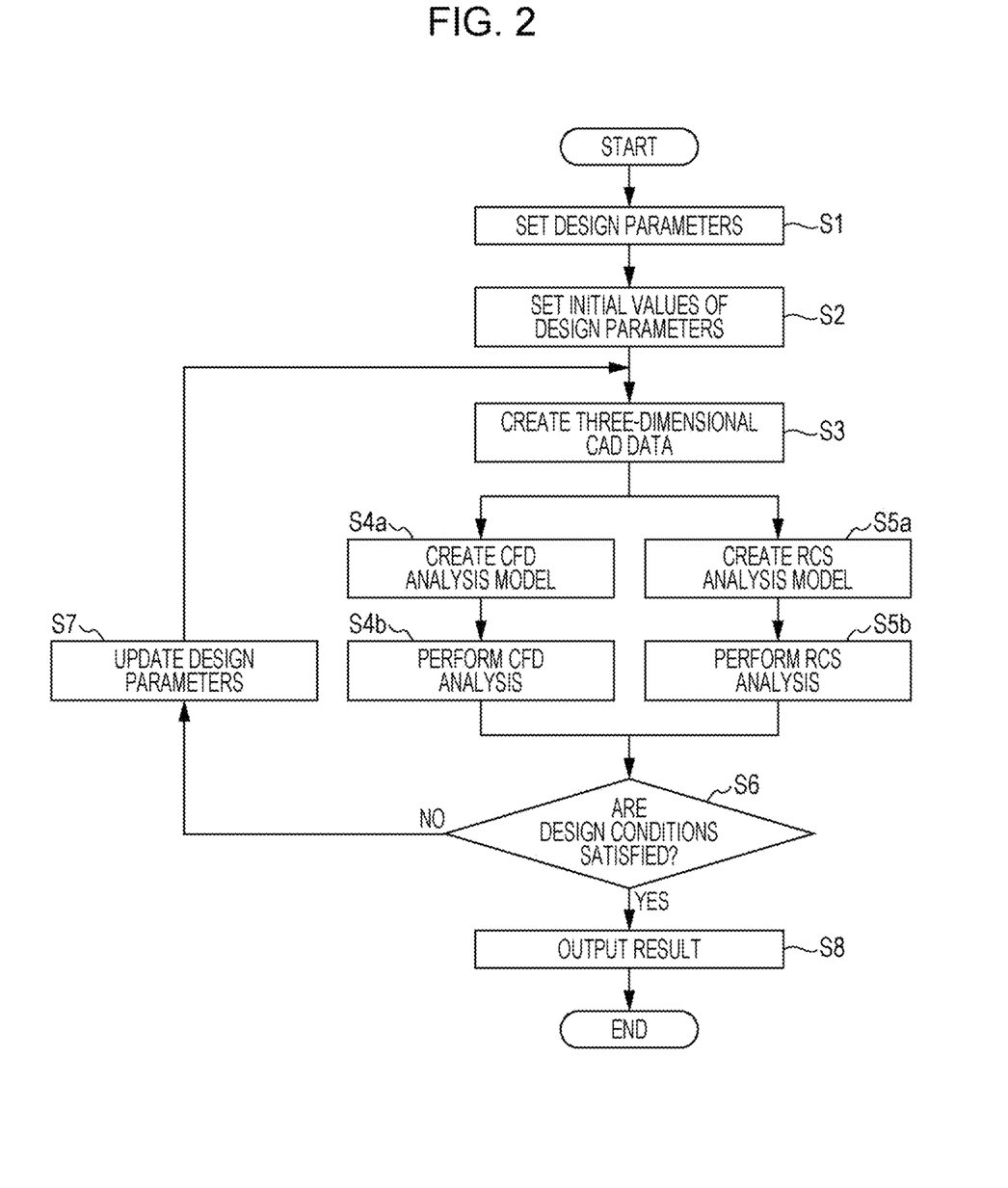
FIG. 2 is a flowchart illustrating the flow of a shape designing process according to the first example.
Figure 3:
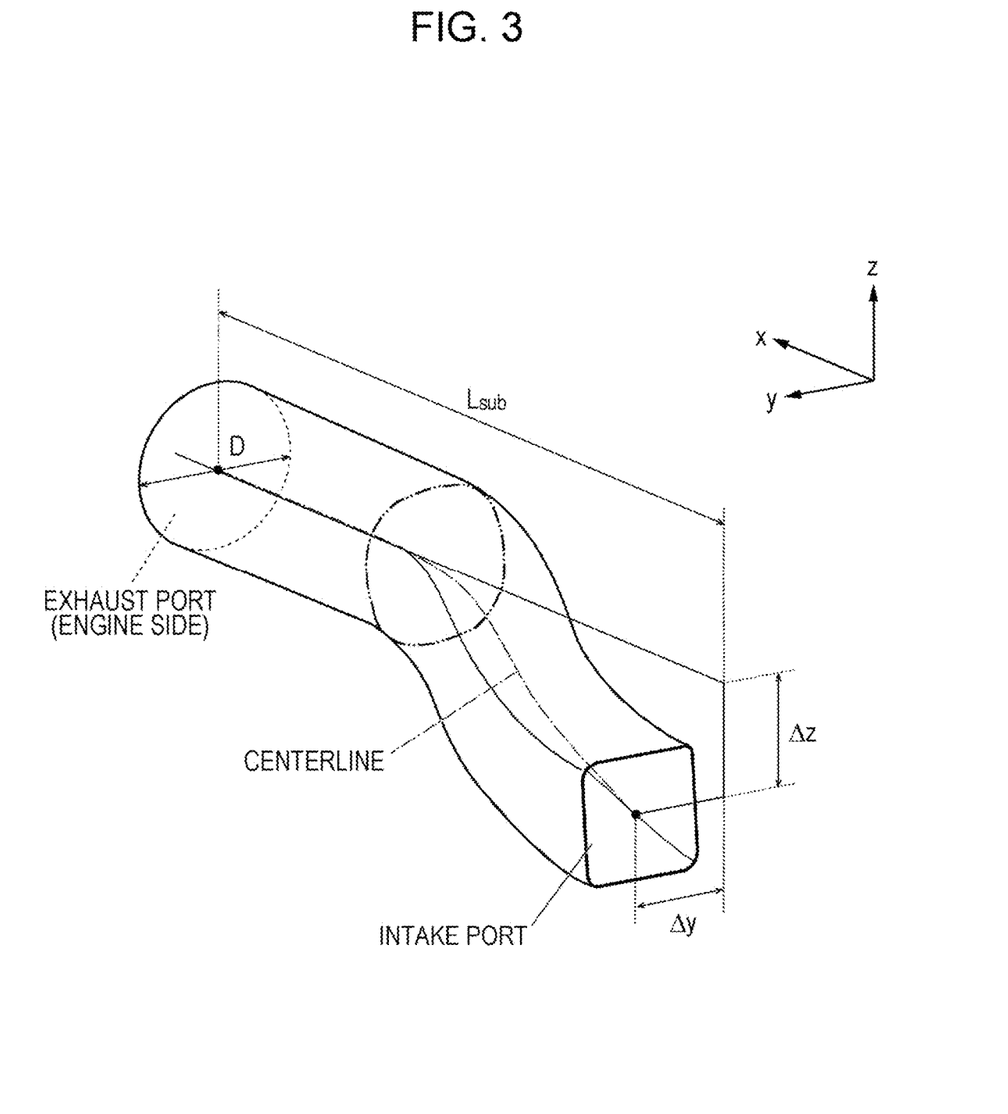
FIG. 3 is a design model diagram of an intake duct according to the first example.

FIG. 2 is a flowchart illustrating the flow of the shape designing process in the first example, and FIG. 3 is a design model diagram of the intake duct.

The shape designing process involves designing the shape (of an intake duct in the first example) that affects the aerodynamic characteristics and the RCS characteristics (stealth characteristics) of an aircraft. When a user inputs an execution command for this shape designing process, the CPU 14 executes the shape designing process by reading and deploying the shape designing program 130 from the storage unit 13.

As illustrated in FIG. 2, when the shape designing process is executed, the CPU 14 first receives design conditions set (input) by the user (step S1). In the first example, the following optimizing condition and limiting condition are set as the design conditions.

An optimizing condition is a condition for optimizing a result of the shape designing process. In the first example, for instance, the total-pressure recovery rate inside the duct is maximized (aerodynamic characteristics: good) and the radar cross section is minimized (stealth characteristics: good). In this case, the radar cross section may be, for instance, a median value evaluated in a predetermined range in the azimuth direction and the elevation direction with reference to the bow direction.

A limiting condition indicates that, for instance, the duct length is fixed in the first example.

The CPU 14 receives these optimizing and limiting conditions input by the user and stores these conditions as the design conditions into the design-condition storage region 133.

The design conditions may alternatively not include the aforementioned optimizing condition if the design conditions are conditions that limit the shape of the design object to be obtained.

Subsequently, the CPU 14 receives initial values of design parameters set (input) by the user (step S2).

In the first example, the design parameters include variables that take into consideration the length ratio, the shape of the centerline, the cross-sectional shape, and the cross-sectional-area distribution, which may conceivably have a large effect on the aerodynamic characteristics and the RCS characteristics (stealth characteristics). Specifically, as illustrated in FIG. 3, the following design parameters P1 to P11 are used.

Design parameter P1: $L_{sub}/D$

Design parameters P2 and P3: Control parameters that control $\Delta y/D$ when the length positions are 30% and 100%, respectively Design parameters P4 and P5: Control parameters that control $\Delta z/D$ when the length positions are 30% and 100%, respectively Design parameters P6 and P7: Control parameters that control the length position when the cross-sectional area begins and stops increasing, respectively Design parameters P8 to P11: Cross-sectional-shape control points (coordinates) when the length position is 50%

The x, y, and z axes correspond to the front-rear direction, the left-right direction, and the up-down direction of the aircraft, respectively, and the length position is a position in the x direction with an intake port as the point of origin. $L_{sub}$ denotes the overall length in the x direction, D denotes the diameter of an exhaust port, $\Delta y$ denotes an offset amount of the centerline in the y direction, and $\Delta z$ denotes an offset amount of the centerline in the z direction.

In step S2, for instance, values of predetermined reference shapes (e.g., shapes set with reference to other aircraft examples) are input as initial values with respect to these design parameters P1 to P11. Then, the CPU 14 receives the initial values of the design parameters P1 to P11 input by the user and stores the initial values into the design-parameter storage region 134.

Subsequently, as illustrated in FIG. 2, based on user operation, the CPU 14 creates three-dimensional CAD data of the design object (the intake duct in the first example) by using the design parameters P1 to P11 stored in the design-parameter storage region 134 (step S3). More specifically, the three-dimensional shape of the design object is created in accordance with a non-uniform rational basis spline (NURBS) function with the design parameters P1 to P11 as control points.

Then, the CPU 14 executes a CFD analysis and an RCS analysis by using the CAD data created in step S3.

Specifically, in accordance with the CFD analyzing program 131, the CPU 14 creates a CFD analysis model by generating an analytical grid based on the CAD data (step S4a), and subsequently executes the CFD analysis (step S4b). At the same time, in accordance with the RCS analyzing program 132, the CPU 14 creates an RCS analysis model by generating an analytical grid based on the CAD data (step S5a), and subsequently executes the RCS analysis (step S5b).

In the first example, the aerodynamic characteristics including the total-pressure recovery rate are calculated as a result of the CFD analysis, and the radar cross section is calculated as a result of the RCS analysis.

Subsequently, the CPU 14 determines whether or not the analytical results obtained from the CFD analysis and the RCS analysis satisfy the design conditions (the optimizing condition and the limiting condition in the first example) set in step S1 (step S6).

With regard to the determination of the optimizing condition, the CPU 14 calculates an objective function expressed as a sum of the aerodynamic characteristics (total-pressure recovery rate) and the RCS characteristics (radar cross section), which have been individually weighted, from the obtained analytical results and determines whether or not the optimizing condition is satisfied by using this objective function.

If it is determined in step S6 that the analytical results obtained from the CFD analysis and the RCS analysis do not satisfy at least one of the design conditions (No in step S6), the CPU 14 updates the design parameters P1 to P11 stored in the design-parameter storage region 134 (step S7) and proceeds to step S3 described above.

In this case, the CPU 14 may update the design parameters P1 to P11 until the analytical results of the CFD analysis and the RCS analysis satisfy the design conditions. However, it is preferable that the design parameters P1 to P11 be updated while being optimized by utilizing either one of an optimizing method, such as a gradient method or a genetic algorithm, and a combination of these methods so that a solution that satisfies both the optimizing condition and the limiting condition is obtained.

Therefore, until the results of the CFD analysis and the RCS analysis satisfy the design conditions, the CPU 14 repeats the CFD analysis and the RCS analysis, the determination of whether or not the analytical results satisfy the design conditions, and the updating of the design parameters P1 to P11 (steps S3 to S7).

If it is determined in step S7 that the analytical results obtained from the CFD analysis and the RCS analysis satisfy the design conditions (Yes in step S6), the CPU 14 outputs the process result to the display unit 12 (step S8) and ends the shape designing process.

According to the first example, the aerodynamic characteristics and the RCS characteristics are repeatedly analyzed while the design parameters P1 to P11 are updated as needed until the aerodynamic characteristics and the RCS characteristics (stealth characteristics) of the intake duct satisfy the predetermined design conditions.

Accordingly, unlike the related art that requires an enormous amount of cost and labor for tests and acquisition of data from insufficient disclosed information of other aircrafts, appropriate design parameter values can be obtained while the design process is automated.

Therefore, with regard to an intake duct that requires both aerodynamic characteristics and stealth characteristics, the intake duct can be appropriately designed while cost and labor are reduced, as compared with the related art.

Second Example

Next, a second example of the present invention will be described. Components similar to those in the first example will be given the same reference characters, and descriptions thereof will be omitted.

Configuration of Aircraft Designing Apparatus 2

Figure 4:
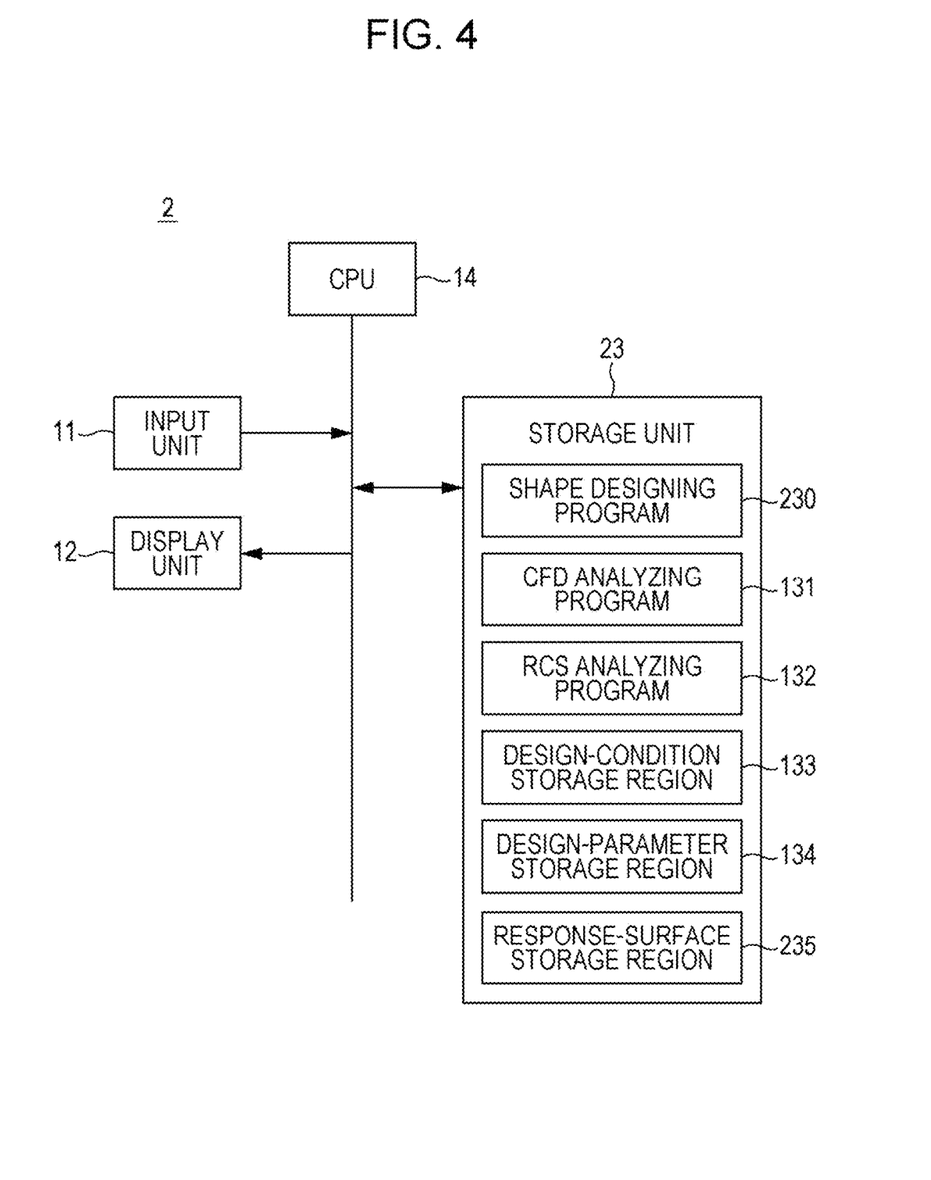
FIG. 4 is a block diagram illustrating a functional configuration of an aircraft designing apparatus according to a second example.

FIG. 4 is a block diagram illustrating a functional configuration of an aircraft designing apparatus 2 according to a second example of the present invention.

Unlike the aircraft designing apparatus 1 according to the first example described above, the aircraft designing apparatus 2 preliminarily generates response surfaces of the aerodynamic characteristics and the RCS characteristics with respect to the predetermined design parameters and determines the shape of the design object based on these response surfaces.

Specifically, as illustrated in FIG. 4, the aircraft designing apparatus 2 includes a storage unit 23 in place of the storage unit 13 in the first example described above.

In addition to storing a shape designing program 230, the storage unit 23 stores a CFD analyzing program 131 and an RCS analyzing program 132 similar to those in the first example.

The shape designing program 230 is an aircraft designing program according to an example of the present invention that causes the CPU 14 to execute a shape designing process (see FIGS. 5A and 5B) according to the second example.

Furthermore, in addition to having a design-condition storage region 133 and a design-parameter storage region 134 similar to those in the first example described above, the storage unit 23 has a response-surface storage region 235.

The response-surface storage region 235 is a memory region that stores response surfaces in the shape designing process to be described later.

Operation of Aircraft Designing Apparatus 2

Next, the operation performed when the aircraft designing apparatus 2 executes the shape designing process will be described. Similar to the first example described above, the following description relates to a case where an intake duct is the design object.

Figure 5A:
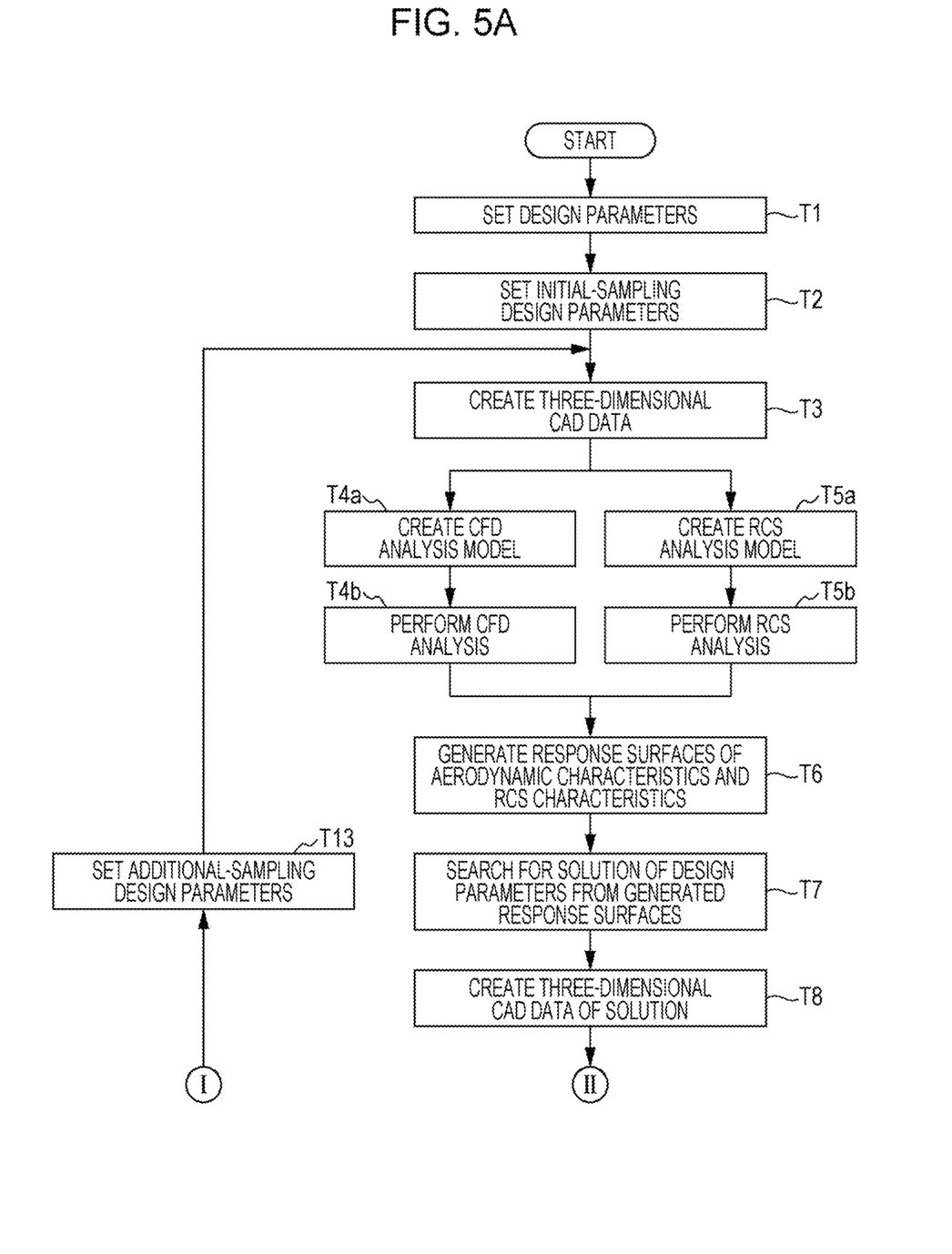
FIGS. 5A and 5B are a flowchart illustrating the flow of a shape designing process according to the second example.
Figure 5B:
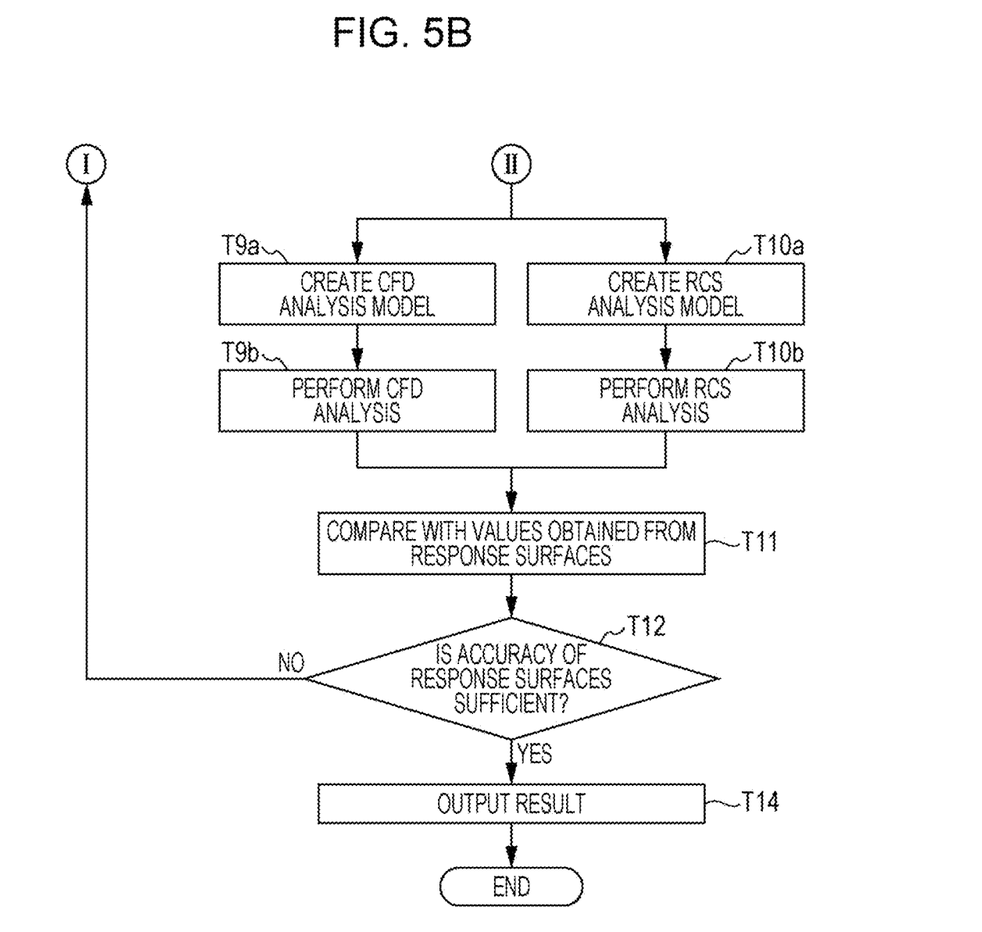

FIGS. 5A and 5B are a flowchart illustrating the flow of the shape designing process according to the second example.

The shape designing process is similar to that in the first example described above in that it involves designing an aircraft shape (an intake duct in the second example) that affects the aerodynamic characteristics and the RCS characteristics (stealth characteristics). When a user inputs an execution command for this shape designing process, the CPU 14 executes the shape designing process by reading and deploying the shape designing program 230 from the storage unit 23.

As illustrated in FIGS. 5A and 5B, when the shape designing process is executed, the CPU 14 first receives design conditions (an optimizing condition and a limiting condition in the second example) set (input) by the user and stores the design conditions into the design-condition storage region 133 (step T1). Step T1 is executed similarly to step S1 in the first example described above.

Subsequently, the CPU 14 receives initial-sampling design parameter values for generating response surfaces that are set (input) based on user operation (step T2).

In the second example, design parameters P1 to P11 similar to those in the first example described above are used. Then, the CPU 14 uses, for instance, an experimental design method to obtain values of multiple sets (e.g., 50 sets) of design parameters P1 to P11 for efficiently obtaining response surfaces, and stores the values of these multiple sets of design parameters P1 to P11 as initial-sampling design parameter values into the design-parameter storage region 134.

Subsequently, the CPU 14 performs a sampling analysis on the multiple sets of design parameters P1 to P11 stored in the design-parameter storage region 134.

Specifically, the CPU 14 creates three-dimensional CAD data for each set of design parameters P1 to P11 (step T3), creates a CFD analysis model and executes a CFD analysis (steps T4a and T4b), and creates an RCS analysis model and executes an RCS analysis (steps T5a and T5b). Steps T3, T4a, T4b, T5a, and T5b are executed similarly to steps S3, S4a, S4b, S5a, and S5b in the first example described above.

Subsequently, the CPU 14 generates response surfaces of the aerodynamic characteristics and the RCS characteristics from multiple sampling analytical results obtained as a result of the CFD analysis and the RCS analysis (step T6).

Figure 6A:
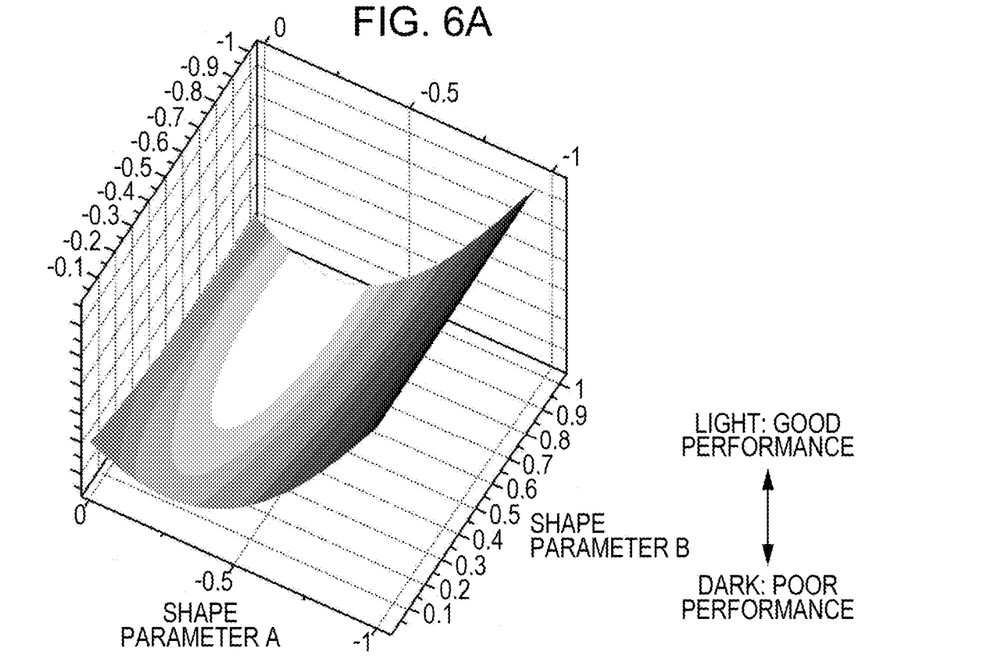
FIG. 6A is a three-dimensional graph illustrating an example of a response surface of aerodynamic characteristics.
Figure 6B:
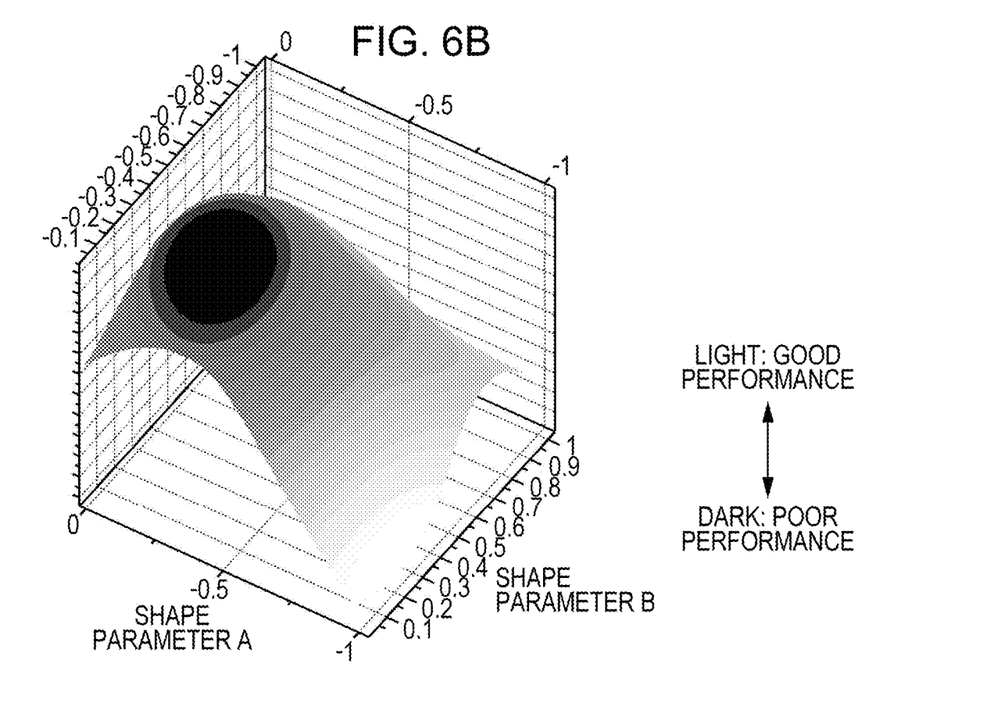
FIG. 6B is a three-dimensional graph illustrating an example of a response surface of radar-cross-section (RCS) characteristics.

More specifically, with respect to the sampling analytical results of the CFD analysis and the RCS analysis, the CPU 14 approximates and interpolates multiple discontinuous sets of sample data in accordance with a continuous function so as to generate response surfaces. Thus, for instance, as illustrated in FIGS. 6A and 6B, response surfaces of the aerodynamic characteristics (total-pressure recovery rate) and the RCS characteristics (radar cross section) with respect to predetermined design parameters A and B can be obtained.

Subsequently, as illustrated in FIGS. 5A and 5B, the CPU 14 searches for a solution of design parameters P1 to P11 that satisfy the design conditions (the optimizing condition and the limiting condition in the second example) from the generated response surfaces of the aerodynamic characteristics and RCS characteristics (step T7).

In this case, the CPU 14 preferably searches for an optimal solution of design parameters P1 to P11 by utilizing, for instance, either one of an optimizing method, such as a gradient method or a genetic algorithm, and a combination of these methods.

Subsequently, the CPU 14 performs an analysis for checking the accuracy of the response surfaces.

Specifically, the CPU 14 creates three-dimensional CAD data by using the obtained solution of design parameters P1 to P11 (step T8), creates a CFD analysis model and executes a CFD analysis (steps T9a and T9b), and creates an RCS analysis model and executes an RCS analysis (steps T10a and T10b). Steps T8, T9a, T9b, T10a, and T10b are executed similarly to steps S3, S4a, S4b, S5a, and S5b in the first example described above.

Subsequently, the CPU 14 compares the obtained analytical results (the aerodynamic characteristics and the RCS characteristics) with values obtained from the response surfaces (step T11).

Then, the CPU 14 determines whether or not the response surfaces have desired accuracy based on a comparison result obtained in step T11 (step T12).

If it is determined in step T12 that a good match is not achieved between the analytical results and the values obtained from the response surfaces and that the accuracy of the response surfaces is not sufficient (No in step T12), the CPU 14 newly sets additional-sampling design parameter values for enhancing the accuracy of the response surfaces (step T13) and proceeds to step T3 described above.

Therefore, the CPU 14 repeatedly adds sampling points, generates (updates) the response surfaces, and checks the accuracy thereof (steps T3 to T13) until a good match is achieved between the analytical results obtained in steps T4b and T5b and the values obtained from the response surfaces.

Then, if it is determined in step T12 that a good match is achieved between the analytical results obtained in steps T4b and T5b and the values obtained from the response surfaces and that the accuracy of the response surfaces is sufficient (Yes in step T12), the CPU 14 outputs the process result to the display unit 12 (step T14) and ends the shape designing process.

According to the second example, the response surfaces of the aerodynamic characteristics and the RCS characteristics (stealth characteristics) with respect to the design parameters P1 to P11 are generated from the analytical results obtained when the design parameters P1 to P11 are applied, and the solution of the design parameters P1 to P11 that satisfy the predetermined design conditions is obtained based on these response surfaces.

Accordingly, unlike the related art that requires an enormous amount of cost and labor for tests and acquisition of data from insufficient disclosed information of other aircrafts, appropriate design parameter values can be obtained while the design process is automated.

Therefore, with regard to an intake duct that requires both aerodynamic characteristics and stealth characteristics, the intake duct can be appropriately designed while cost and labor are reduced, as compared with the related art.

Furthermore, even when there is a need to change the shape after determining the design parameters P1 to P11, it is not necessary to perform the analyses again, and a change in performance in this case can be readily ascertained by simply using the response surfaces.

Furthermore, by comparing the aerodynamic characteristics and the RCS characteristics recalculated by using the solution of the design parameters P1 to P11 with the aerodynamic characteristics and the RCS characteristics obtained directly from the response surfaces, the accuracy of the response surfaces can be checked. If the response surfaces do not have desired accuracy, sampling analytical results are increased by adding new values to the design parameters P1 to P11 so that the response surfaces are updated.

Therefore, the design parameter values can be appropriately obtained by enhancing the accuracy of the response surfaces.

Examples to which the present invention is applicable are not limited to the examples described above and are appropriately modifiable within a scope that does not depart from the spirit of the invention.

For instance, although an intake duct is described as an example of a design object in each of the above examples, the design object of an aircraft to which each of the above examples is applicable does not have to be an intake duct so long as the design object is a part that requires both aerodynamic characteristics and stealth characteristics. However, since the above examples of the present invention are particularly advantageous when applied to a relatively complicated curved shape, the above examples may be suitably applied particularly to designing of the fuselage of an aircraft (such as the bow) and objects mounted to the exterior of the aircraft (such as a missile and a fuel tank), in addition to the main wings and the tail wings. Furthermore, when applying the above examples of the present invention to designing of the entire airframe of an aircraft and so on, the entire airframe becomes the design object.

The objective function and the limiting condition have added thereto indicators that affect the performance of the aircraft, such as the weight thereof, in addition to the aerodynamic characteristics and the RCS characteristics (stealth characteristics), and may be used in combination with each other.

The invention claimed is:

1. An aircraft designing method of designing a shape of an intake duct in an aircraft, the aircraft designing method comprising steps of:
   (1) receiving values of design parameters related to the shape of the intake duct, the design parameters related to the shape of the intake duct including i) a ratio of an overall length of the intake duct from an intake port to an exhaust port of the intake duct and a diameter of an exhaust port of the intake duct, ii) a shape of a centerline, iii) a cross-sectional shape, and iv) a cross-sectional-area distribution;
   (2) creating analysis models for an aerodynamic characteristic analysis and a radar-cross-section analysis by using the values of the design parameters, and performing, based on the values of the design parameters, a computational-fluid-dynamics (CFD) computation to obtain aerodynamic characteristics of the intake duct and a radar-cross-section (RCS) computation to obtain radar-cross-section characteristics of the intake duct so as to obtain an analytical result corresponding to the values of design parameters;
   (3) determining whether or not the aerodynamic characteristics and the radar-cross-section characteristics satisfy a preset design condition;
   (4) outputting the values of the design parameters if a determination indicates that the aerodynamic characteristics and the radar-cross-section characteristics satisfy the preset design condition, and updating the values of the design parameters if the determination indicates that the aerodynamic characteristics and the radar-cross-section characteristics do not satisfy the preset design condition; and
   (5) iterating steps (2), (3), and (4) by using the updated values of the design parameters, until an determination in an iteration indicates that the aerodynamic characteristics and the radar-cross-section characteristics obtained in the iteration satisfy the preset design condition,
   wherein the design condition includes an optimizing condition related to the aerodynamic characteristics and the radar-cross-section characteristics, the optimizing condition including a total pressure recovery rate inside the intake duct being maximized while the radar cross section is minimized, wherein step (4) includes updating the values of the design parameters while optimizing the values of the design parameters if the determination indicates that the aerodynamic characteristics and the radar-cross-section characteristics do not satisfy the preset design condition including the optimizing condition, and wherein whether or not the optimizing condition is satisfied is determined by calculating an objective function expressed as a sum of the aerodynamic characteristics and the radar-cross-section characteristics which are individually weighted, from the obtained analytical result.

2. An aircraft designing method of designing a shape of an intake duct in an aircraft, the aircraft designing method comprising steps of:

(1) receiving values of design parameters related to the shape of the intake duct, the design parameters related to the shape of the intake duct including i) a length ratio of an overall length of the intake duct from an intake port to an exhaust port of the intake duct and a diameter of an exhaust port of the intake duct, ii) a shape of a centerline, iii) a cross-sectional shape, and iv) a cross-sectional-area distribution;

(2) creating analysis models for an aerodynamic characteristic analysis and a radar-cross-section analysis with respect to the values of the design parameters, and performing, based on the values of the design parameters, a computational-fluid-dynamics (CFD) computation to obtain aerodynamic characteristics of the intake duct and a radar-cross-section (RCS) computation to obtain radar-cross-section characteristics of the intake duct so as to obtain sampling analytical results corresponding to the values of the design parameters;

(3) generating response surfaces of the aerodynamic characteristics and the radar-cross-section characteristics with respect to the design parameters from the sampling analytical results; and (4) outputting a solution of the design parameters that satisfies a preset design condition based on the response surfaces of the aerodynamic characteristics and the radar-cross-section characteristics, wherein the design condition includes an optimizing condition related to the aerodynamic characteristics and the radar-cross-section characteristics, the optimizing condition including a total pressure recovery rate inside the intake duct being maximized while the radar cross section is minimized, wherein step (4) includes outputting an optimal solution of the design parameters that satisfies the design condition including the optimizing condition, and wherein whether or not the optimizing condition is satisfied is determined by calculating an objective function expressed as a sum of the aerodynamic characteristics and the radar-cross-section characteristics, which are individually weighted, from the obtained analytical result.

3. A non-transitory computer-readable medium storing an aircraft designing program that designs a shape of an intake duct in an aircraft, when the program is executed by a computer, causing the computer to:

(1) receive values of design parameters related to the shape of the intake duct, the design parameters related to the shape of the intake duct including i) a length ratio, ii) a shape of a centerline that extends from a center of an intake port to a center of an exhaust port of the intake duct, the shape of the centerline including an offset amount of the centerline in a horizontal direction from the center of the intake port to the center of the exhaust port and an offset amount of the centerline in a vertical direction from the center of the intake port to the center of the exhaust port, iii) a cross-sectional shape, and iv) a cross-sectional-area distribution;

(2) create analysis models for an aerodynamic characteristic analysis and a radar-cross-section analysis by using the values of design parameters, and perform, based on the values of design parameters, computational-fluid-dynamics (CFD) computation to obtain aerodynamic characteristics of the intake duct and a radar-cross-section (RCS) computation to obtain radar-cross-section characteristics of the intake duct so as to obtain an analytical result corresponding to the values of design parameters;

(3) determine whether or not the aerodynamic characteristics and the aerodynamic characteristics satisfy a preset design condition;

(4) output the value of the values of the design parameters if a determination indicates that the aerodynamic characteristics and the radar-cross-section characteristics satisfy the preset design condition, and update the values of the design parameters if the determination indicates that the aerodynamic characteristics and the aerodynamic characteristics do not satisfy the preset design condition; and (5) iterate (2), (3), and (4) by using the updated values of design parameters, until a determination in an iteration indicates that the aerodynamic characteristics and the aerodynamic characteristics obtained in the iteration satisfy the preset design condition, wherein the design condition includes an optimizing condition related to the aerodynamic characteristics and the radar-cross-section characteristics, the optimizing condition including a total pressure recovery rate inside the intake duct being maximized while the radar cross section is minimized, wherein step (4) includes updating the values of the design parameters while optimizing the values of the design parameters if the determination indicates that the aerodynamic characteristics and the radar-cross-section characteristics do not satisfy the preset design condition including the optimizing condition, and wherein whether or not the optimizing condition is satisfied is determined by calculating an objective function expressed as a sum of the aerodynamic characteristics and the radar-cross-section characteristics, which are individually weighted, from the obtained analytical result.

4. A non-transitory computer-readable medium storing an aircraft designing program that designs a shape of an intake duct in an aircraft, when the program is executed by a processor, causing the processor to:

receive values of design parameters related to the shape of the intake duct, the design parameters related to the shape of the intake duct including i) a length ratio, ii) a shape of a centerline that extends from a center of an intake port to a center of an exhaust port of the intake duct, the shape of the centerline including an offset amount of the centerline in a horizontal direction from the center of the intake port to the center of the exhaust port and an offset amount of the centerline in a vertical direction from the center of the intake port to the center of the exhaust port, iii) a cross-sectional shape, and iv) a cross-sectional-area distribution;

create analysis models for an aerodynamic characteristic analysis and a radar-cross-section analysis with respect to the values of design parameters, perform, based on the values of design parameters, a computational-fluid-dynamics (CFD) computation to obtain aerodynamic characteristics and a radar-cross-section (RCS) computation to obtain radar-cross-section characteristics of the intake duct so as to obtain sampling analytical results corresponding to the values of design parameters;

generate response surfaces of the aerodynamic characteristics and the radar-cross-section characteristics with respect to the design parameters from the sampling analytical results; and output a solution of the design parameters that satisfies a preset design condition based on the response surfaces of the aerodynamic characteristics and the radar-cross-section characteristics, wherein the design condition includes an optimizing condition related to the aerodynamic characteristics and the radar-cross-section characteristics, the optimizing condition including a total pressure recovery rate inside the intake duct being maximized while the radar cross section is minimized, wherein outputting the solution of the design parameters includes outputting an optimal solution of the design parameters that satisfies the design condition including the optimizing condition, and wherein whether or not the optimizing condition is satisfied is determined by calculating an objective function expressed as a sum of the aerodynamic characteristics and the radar-cross-section characteristics, which are individually weighted, from the obtained analytical result.

5. A computer that designs a shape of an intake duct in an aircraft, the computer comprising:
a processor; and
a memory comprising instructions, when instructions executable by the processor causing the processor to:
(1) receive values of design parameters related to the shape of the intake duct, the design parameters related to the shape of the intake duct including i) a length ratio, ii) a shape of a centerline, iii) a cross-sectional shape of the intake duct at a middle of the intake duct, and iv) a cross-sectional-area distribution;
(2) create analysis models for an aerodynamic characteristic analysis and a radar-cross-section analysis by using the values of design parameters, and perform, based on the values of design parameters, a computational-fluid-dynamics (CFD) computation to obtain aerodynamic characteristics of the intake duct and a radar-cross-section (RCS) computation to obtain radar-cross-section characteristics of the intake duct so as to obtain an analytical result corresponding to the values of design parameters;
(3) determine whether or not the aerodynamic characteristics and the aerodynamic characteristics satisfy a preset design condition;
(4) output the values of the design parameters if a determination indicates that the aerodynamic characteristics and the radar-cross-section characteristics satisfy the preset design condition, and update the values of the design parameters if the determination indicates that the aerodynamic characteristics and the aerodynamic characteristics do not satisfy the preset design condition; and
(5) iterate (2), (3), and (4) by using the updated values of the design parameters, until a determination in an iteration indicates that the aerodynamic characteristics and the aerodynamic characteristics obtained in the iteration satisfy the preset design condition, wherein the design condition includes an optimizing condition related to the aerodynamic characteristics and the radar-cross-section characteristics, the optimizing condition including a total pressure recovery rate inside the intake duct being maximized while the radar cross section is minimized, wherein step (4) includes updating the values of the design parameters while optimizing the values of the design parameters if the determination indicates that the aerodynamic characteristics and the radar-cross-section characteristics do not satisfy the preset design condition including the optimizing condition, and wherein whether or not the optimizing condition is satisfied is determined by calculating an objective function expressed as a sum of the aerodynamic characteristics and the radar-cross-section characteristics, which are individually weighted, from the obtained analytical result.

6. A computer that designs a shape of an intake duct in an aircraft, the computer comprising:
a processor; and
a memory comprising instructions, when instructions executable by the processor causing the processor to:
receive values of design parameters related to the shape of the intake duct, the design parameters related to the shape of the intake duct including i) a length ratio, ii) a shape of a centerline, iii) a cross-sectional shape of the intake duct at a middle of the intake duct, and iv) a cross-sectional-area distribution;
create analysis models for an aerodynamic characteristic analysis and a radar-cross-section analysis with respect to the values of design parameters and perform, based on the values of design parameters, a computational-fluid-dynamics (CFD) computation to obtain aerodynamic characteristics and a radar-cross-section (RCS) computation to obtain radar-cross-section characteristics of the intake duct so as to obtain sampling analytical results corresponding to the values of design parameters;
generate response surfaces of the aerodynamic characteristics and the radar-cross-section characteristics with respect to the design parameters from the sampling analytical results; and
output a solution of the design parameters that satisfies a preset design condition based on the response surfaces of the aerodynamic characteristics and the radar-cross-section characteristics, wherein the design condition includes an optimizing condition related to the aerodynamic characteristics and the radar-cross-section characteristics, the optimizing condition including a total pressure recovery rate inside the intake duct being maximized while the radar cross section is minimized, wherein outputting the solution of the design parameters includes updating the values of the design parameters while optimizing the values of the design parameters if the determination indicates that the aerodynamic characteristics and the radar-cross-section characteristics do not satisfy the preset design condition including the optimizing condition, and wherein whether or not the optimizing condition is satisfied is determined by calculating an objective function expressed as a sum of the aerodynamic characteristics and the radar-cross-section characteristics, which are individually weighted, from the obtained analytical result.

7. An aircraft designing method of designing a shape of an intake duct in an aircraft, the aircraft designing method comprising steps of:
(1) receiving values of design parameters related to the shape of the intake duct, the design parameters related to the shape of the intake duct including i) a length ratio, ii) a shape of a centerline, iii) a cross-sectional shape, and iv) a cross-sectional-area distribution including a start point where a cross-sectional-area of the intake duct starts increasing and an end point where the cross-sectional-area of the intake duct ends increasing;
(2) creating analysis models for an aerodynamic characteristic analysis and a radar-cross-section analysis with respect to the values of the design parameters, and performing, based on the values of the design parameters, a computational-fluid-dynamics (CFD) computation to obtain aerodynamic characteristics of the intake duct and a radar-cross-section (RCS) computation to obtain radar-cross-section characteristics of the intake duct so as to obtain sampling analytical results corresponding to the values of the design parameters;
(3) generating response surfaces of the aerodynamic characteristics and the radar-cross-section characteristics with respect to the design parameters from the sampling analytical results; and
(4) outputting a solution of the design parameters that satisfies a preset design condition based on the response surfaces of the aerodynamic characteristics and the radar-cross-section characteristics;
(5) create analysis models for an aerodynamic characteristic analysis and a radar-cross-section analysis by using the solution of the design parameters, and re-perform, based on the solution of the design parameters, the CFD computation to obtain the aerodynamic characteristics and the RCS computation to obtain the radar-cross-section characteristics of the intake duct to so as to obtain a first analytical result;
(6) compare the first analytical result with the aerodynamic characteristics and the radar-cross-section characteristics obtained from the response surfaces generated in step (3), and determine whether or not the response surfaces have accuracy based on a comparison result; and
(7) if a determination indicates that the response surfaces do not have the accuracy, add new sampling points to the design parameters and perform steps (2) and (3) so as to update the response surfaces based on at least the new sampling points,
wherein the design condition includes an optimizing condition related to the aerodynamic characteristics and the radar-cross-section characteristics, the optimizing condition including a total pressure recovery rate inside the intake duct being maximized while the radar cross section is minimized,
wherein step (4) includes outputting an optimal solution of the design parameters that satisfies the design condition including the optimizing condition, and
wherein whether or not the optimizing condition is satisfied is determined by calculating an objective function expressed as a sum of the aerodynamic characteristics and the radar-cross-section characteristics, which are individually weighted, from the obtained analytical result.

8. A non-transitory computer-readable medium storing an aircraft designing program that designs a shape of an intake duct in an aircraft, when the program is executed by a processor, causing the processor to:
(1) receive values of design parameters related to the shape of the intake duct, the design parameters related to the shape of the intake duct including i) a length ratio, ii) a shape of a centerline, iii) a cross-sectional shape, and iv) a cross-sectional-area distribution including a start point where a cross-sectional-area of the intake duct starts increasing and an end point where the cross-sectional-area of the intake duct ends increasing;
(2) create analysis models for an aerodynamic characteristic analysis and a radar-cross-section analysis with respect to the values of the design parameters, and performing, based on the values of the design parameters, a computational-fluid-dynamics (CFD) computation to obtain aerodynamic characteristics of the intake duct and a radar-cross-section (RCS) computation to obtain radar-cross-section characteristics of the intake duct so as to obtain sampling analytical results corresponding to the values of the design parameters;
(3) generate response surfaces of the aerodynamic characteristics and the radar-cross-section characteristics with respect to the design parameters from the sampling analytical results; and
(4) output a solution of the design parameters that satisfies a preset design condition based on the response surfaces of the aerodynamic characteristics and the radar-cross-section characteristics;
(5) create analysis models for an aerodynamic characteristic analysis and a radar-cross-section analysis by using the solution of the design parameters, and re-perform, based on the solution of the design parameters, the CFD computation to obtain the aerodynamic characteristics and the RCS computation to obtain the radar-cross-section characteristics of the intake duct to so as to obtain a first analytical result;
(6) compare the first analytical result with the aerodynamic characteristics and the radar-cross-section characteristics obtained from the response surfaces generated in step (3), and determine whether or not the response surfaces have accuracy based on a comparison result; and
(7) if a determination indicates that the response surfaces do not have the accuracy, add new sampling points to the design parameters and perform steps (2) and (3) so as to update the response surfaces based on at least the new sampling points,
wherein the design condition includes an optimizing condition related to the aerodynamic characteristics and the radar-cross-section characteristics, the optimizing condition including a total pressure recovery rate inside the intake duct being maximized while the radar cross section is minimized,
wherein step (4) includes outputting an optimal solution of the design parameters that satisfies the design condition including the optimizing condition, and
wherein whether or not the optimizing condition is satisfied is determined by calculating an objective function expressed as a sum of the aerodynamic characteristics and the radar-cross-section characteristics, which are individually weighted, from the obtained analytical result.

9. A computer that designs a shape of an intake duct in an aircraft, the computer comprising:
a processor; and
a memory comprising instructions, when instructions executable by the processor causing the processor to:
(1) receive values of design parameters related to the shape of the intake duct, the design parameters related to the shape of the intake duct including i) a length ratio of an overall length of the intake duct from an intake port to an exhaust port of the intake duct and a diameter of an exhaust port of the intake duct, ii) a shape of a centerline that extends from a center of the intake port to a center of the exhaust port, the shape of the centerline including an offset amount of the centerline in a horizontal direction from the center of the intake port to the center of the exhaust port and an offset amount of the centerline in a vertical direction from the center of the intake port to the center of the exhaust port, iii) a cross-sectional shape of the intake duct at a middle of the intake duct, and iv) a cross-sectional-area distribution including a start point where a cross-sectional-area of the intake duct starts increasing and an end point where the cross-sectional-area of the intake duct ends increasing;
(2) create analysis models for an aerodynamic characteristic analysis and a radar-cross-section analysis with respect to the values of the design parameters, and performing, based on the values of the design parameters, a computational-fluid-dynamics (CFD) computation to obtain aerodynamic characteristics of the intake duct and a radar-cross-section (RCS) computation to obtain radar-cross-section characteristics of the intake duct so as to obtain sampling analytical results corresponding to the values of the design parameters;
(3) generate response surfaces of the aerodynamic characteristics and the radar-cross-section characteristics with respect to the design parameters from the sampling analytical results; and
(4) output a solution of the design parameters that satisfies a preset design condition based on the response surfaces of the aerodynamic characteristics and the radar-cross-section characteristics;
(5) create analysis models for an aerodynamic characteristic analysis and a radar-cross-section analysis by using the solution of the design parameters, and re-perform, based on the solution of the design parameters, the CFD computation to obtain the aerodynamic characteristics and the RCS computation to obtain the radar-cross-section characteristics of the intake duct to so as to obtain a first analytical result;
(6) compare the first analytical result with the aerodynamic characteristics and the radar-cross-section characteristics obtained from the response surfaces generated in step (3), and determine whether or not the response surfaces have accuracy based on a comparison result; and
(7) if a determination indicates that the response surfaces do not have the accuracy, add new sampling points to the design parameters and perform steps (2) and (3) so as to update the response surfaces based on at least the new sampling points,
wherein the design condition includes an optimizing condition related to the aerodynamic characteristics and the radar-cross-section characteristics, the optimizing condition including a total pressure recovery rate inside the intake duct being maximized while the radar cross section is minimized,
wherein step (4) includes outputting an optimal solution of the design parameters that satisfies the design condition including the optimizing condition, and
wherein whether or not the optimizing condition is satisfied is determined by calculating an objective function expressed as a sum of the aerodynamic characteristics and the radar-cross-section characteristics, which are individually weighted, from the obtained analytical result.

* * * * *